(12) United States Patent
Palanisamy

(10) Patent No.: US 6,518,732 B2
(45) Date of Patent: Feb. 11, 2003

(54) SYSTEM AND METHOD FOR OPTIMAL BATTERY USAGE IN ELECTRIC AND HYBRID VEHICLES

(75) Inventor: Thirumalai G. Palanisamy, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/817,727

(22) Filed: Mar. 26, 2001

(65) Prior Publication Data

US 2001/0035740 A1 Nov. 1, 2001

Related U.S. Application Data

(60) Provisional application No. 60/192,214, filed on Mar. 27, 2000.

(51) Int. Cl.⁷ .................... H01M 10/44; H01M 10/46
(52) U.S. Cl. ................................................ 320/147
(58) Field of Search ................................ 320/103, 104, 320/147, 160, 163

(56) References Cited

U.S. PATENT DOCUMENTS

| | | | |
|---|---|---|---|
| 3,808,481 A | * | 4/1974 | Rippel |
| 4,313,080 A | * | 1/1982 | Park |
| 5,867,009 A | | 2/1999 | Kiuchi et al. .................. 322/16 |
| 6,198,254 B1 | | 3/2001 | Satake et al. ................ 320/132 |

* cited by examiner

Primary Examiner—Edward H. Tso

(57) ABSTRACT

A method and apparatus (FIG. 1) for optimizing recharging of batteries (20) in an electric or hybrid vehicle that uses an electric motor (35) powered by the batteries (20) and having a regenerative system (10) that uses mechanical forces of the vehicle to generate current to recharge the batteries. The output of the regenerative system is controlled (15 and 35) to supply a maximum amount of current to recharge the batteries immediately after termination of a pulse or continuous discharge thereby to recapture a larger portion of the discharge current (FIG. 3) and the battery voltage is monitored (35) during recharge and the voltage is controlled (15) during charge so that it does not exceed a predetermined value at which battery gas evolution takes place (FIG. 2), thereby permitting the battery to be charged to a relatively high state of charge.

9 Claims, 4 Drawing Sheets

SYSTEM AND METHOD FOR OPTIMAL BATTERY USAGE IN ELECTRIC AND HYBRID VEHICLES

RELATED APPLICATION

This application claims priority pursuant to 35 U.S.C. 119 based upon U.S. provisional application Serial No. 60/192,214 filed Mar. 27, 2000, the entire disclosure of which is incorporated herein by reference.

FIELD OF THE INVENTION

The invention relates to a system and method for optimizing the charging of batteries in electric and hybrid vehicles.

BACKGROUND OF THE INVENTION

Electric vehicles have an electric motor as a power source that uses batteries or fuel cells as the source of energy. Hybrid vehicles generally have two different power sources to drive the vehicle, usually one being an internal combustion engine and the other an electric motor that is powered by an energy source, such as batteries. The batteries are of the rechargeable type. Other types of energy sources such as super-capacitors also can be used. Both kinds of vehicles also are usually equipped with a regenerative system which converts vehicle kinetic energy into electrical energy to recharge the energy source, here considered to be one or more batteries. For example, as the vehicle undergoes braking, the braking force drives the electric motor of the vehicle operated as a generator, or drives a separate generator, that is used to generate electrical energy (current) to recharge the batteries. The electric energy produced by the regenerative system is stored in the vehicle batteries and is used to power the vehicle electric motor when needed.

When batteries are used in electric or hybrid vehicles, they are generally maintained in a state of charge (SOC) range at which the battery internal resistance (IR) is minimal, especially in a charging condition. This is done for the purpose of preventing excessive heating and to have high efficiency of charging, meaning that most of the energy goes to charging and very little is wasted in heating due to the high impedance of the battery, from the regenerative braking system. For example, for lead-acid batteries, these often being used in electric and hybrid vehicles, the batteries are kept at a relatively low SOC level of around 60%–65%. However, batteries tend to degrade faster under the condition of prolonged time in undercharged (low SOC) condition. For example, lead acid batteries tend to become sulfated and thereby have a shortened battery life.

Normally, it has been believed in the state of the art that when an electric or hybrid vehicle battery is above 70% SOC that the charge is accompanied by an undesirable overcharge gas evolution reaction. This is particularly true for lead acid batteries. I have determined that this holds true only when the battery is charged after it has been allowed to reach an equilibrium state. A battery reaches an equilibrium state after it is allowed to rest (no charge or discharge) for a period of time, for example, about 2–3 hours in a lead acid battery. By looking at the battery in situ current voltage characteristics, it can be determined if the battery is at equilibrium or not. This is done by determining if a current is present, whether positive or negative, and if it is, the battery is not in equilibrium. Similarly, if the voltage is above the upper limit or below a lower limit it is not in equilibrium.

In electric and hybrid vehicles, the regenerative energy is dumped (charged) into the battery when it is not at equilibrium. Generally, the battery keeps discharging as it is used to power the electric motor until the instant when the brakes are applied and at this time the regenerative energy is dumped into the battery. Typically, in the present state of the art, even though a battery of an electric or hybrid vehicle is charged before it reaches a state of equilibrium while in the vehicle by the regenerative system, the SOC value is still held at about 65%. That is, using present technology, the amount of the regenerative energy supplied to charge the battery is controlled as a function of battery SOC so that the battery SOC does not exceed 65%.

Accordingly, a need exists to control the charge of a battery in an electric or hybrid vehicle to place and maintain it at a higher level of SOC.

BRIEF DESCRIPTION OF THE INVENTION

I have determined that a battery can be charged at very high efficiency if the battery is charged immediately after a pulse type discharge or a continuous discharge. In an electric or hybrid vehicle, the continuous discharge would use the batteries as a source over a 1s period of time to power the vehicle electric motor. The pulse would be a short burst of use of the vehicle electric motor. It has been found that when a battery is discharged by current pulses or continuous current, it can be immediately charged up to about 80% of the energy taken out during the discharge. This can be accomplished even if the battery SOC is above 80% when the discharge is stopped. It also has been found that a battery can be charged to a higher SOC than the 65% value that is currently used in electric and hybrid vehicles.

In accordance with my invention, the regenerative system is operated to immediately charge the battery upon discharge being terminated. The charging is carried out to the maximum extent possible, the charge current limitation being predominantly determined by the circuit characteristics of the battery charging system, such as the current carrying capacity of the wires and other components. Hardware control elements in the battery charging system are provided to prevent the charging current from rising above this safe level. Normally, charging current will be limited automatically to a smaller value than the safe limit when the battery voltage is controlled to a desired level.

In any system, as a battery is charged, its SOC increases over time. Thus, a battery can be charged to a high SOC value merely by continuing the charging time. In the present invention, the dumping of the regenerative energy into the battery for its charge is controlled as a factor of battery charge current and battery voltage limitations instead of the SOC, which is used in the present systems to achieve and maintain a higher level than the 65% SOC that is currently used.

In a preferred embodiment of the invention, a higher SOC is obtained. As is known, at a certain point during charge, a battery will start to produce gas. I have determined that there is a relationship between the current and voltage of the battery during charging and the time at which the gas point is reached. In accordance with the preferred embodiment of my invention, the charge voltage is monitored and is limited based on the battery gas point characteristics, such as Igas and Vgas. At the gas point, at least for a lead-acid battery, the SOC will be higher than 65%, often in the range of 80%–90%, depending on the battery construction. The charging is limited or terminated before the gas point is reached. The gas point parameters may be determined from battery parameters other than the in situ current-voltage characteristics. For example, the battery voltage during charging or rate of change of battery internal impedance may be used to detect the gas point.

By following guidelines listed above, hybrid and electric vehicle batteries can be charged at greater efficiency when not in a state of equilibrium and also operated at a higher level of SOC, for example, around 80% SOC, and perhaps even up to 90% SOC. This contrasts with the present 60%–65% SOC for present day hybrid and electric vehicle batteries. This higher SOC level of operation results in longer battery life and better fuel efficiency in the case of hybrid vehicles.

OBJECTS OF THE INVENTION

It is an object of the invention to provide a method and apparatus for controlling the charging of batteries in electric and hybrid vehicles to an optimal SOC value.

Another object is to provide a method and system for charging batteries in electric and hybrid vehicles in which the batteries are charged at a high current level after a continuous discharge or pulse discharge under dynamic operating conditions to a high level of SOC as determined by the battery voltage level during charge.

Yet another object is to provide a method and system for optimizing the charging of batteries in electric or hybrid vehicles in which charging is controlled to bring the batteries to a relatively high level SOC.

Still a further object is to provide a method and system for charging the batteries in electric or hybrid vehicles to a relatively high level SOC without exceeding the gas point of the batteries.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
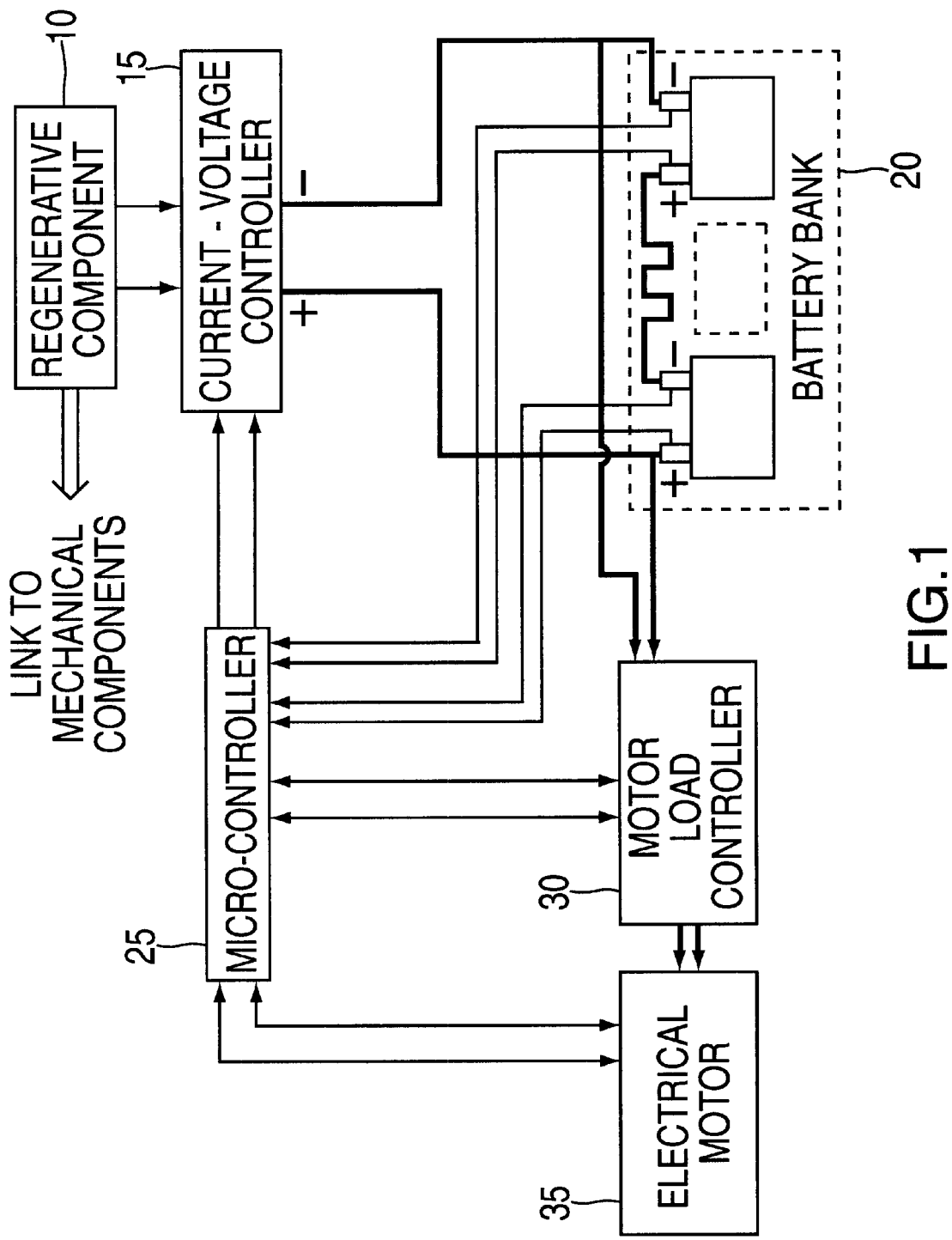
FIG. 1 is a schematic diagram of a typical apparatus to be used for optimizing the performance of the batteries in an electric or a hybrid vehicle.

Referring to FIG. 1, the system includes a regenerative energy source component 10. This is a device that converts the kinetic energy usually wasted in the vehicle braking process into electrical energy. For example, it can be a separate electric generator driven by the wheels as they brake. It also may be the electric vehicle's or hybrid vehicle's electric motor that is operated as an electric generator that is activated when the vehicle brake pedal is pressed. The regenerative component 10 is suitably linked to a vehicle mechanical energy system, such as the brakes and/or wheels. Sensors (not shown) are provided to actuate component 10 when the vehicle braking occurs.

The electric energy (current) output from the regenerative component 10 is regulated to the desired voltage and current levels by a current-voltage controller 15 (hereafter CV controller). The CV controller 15 has the necessary components, such as capacitors, inductors and associated circuitry, to store some reasonable amount of energy temporarily and to regulate the output. The CV controller 15 receives the energy from the regenerative component 10 and supplies the current to recharge one or more batteries in a battery bank 20 located in the vehicle. The batteries in the bank can be of any suitable conventional type, such as lead-acid, and of any desired capacity, usually rated in amp hours. Each battery in the bank 20 has a number of cells and the batteries are connected in any suitable series parallel array to achieve a desired current and voltage output.

The functions of the CV controller 15 is controlled by commands sent from a micro-controller 25. The micro-controller 25 is any suitable microprocessor type device that is programmable and has the necessary memory (ROM and RAM) and an arithmetic logic unit. It is preferred that the micro-controller 25 be programmable from an external source, such as by a serial bus. The micro-controller 25 also has the necessary circuits such as analog to digital and digital to analog converters. It receives analog data from the CV controller 15 and supplies operating command signal data back to operate CV controller 15. The micro-controller 25 also receives data, such as the open circuit voltage and voltage during charging, from each battery in the battery bank 20 or the voltage of the total bank. It also receives data of the current drawn from or charged to the battery bank, such as measured across a shunt (not shown) and battery case temperature from a suitable sensor. The micro-controller 25 also stores control programs and algorithms.

The battery bank 20 is also connected through a motor load controller 30 to the vehicle's electric motor 35, which uses the energy from the battery bank 20 as and when needed. The motor 35 also can be operated as a dual function device so that it also can serve as the regenerative component 10.

The voltage and current going into the batteries of the battery bank 20 through the CV controller 15 and out through the motor load controller 30 is continuously monitored by the micro-controller 25. The sensor output of various components 15, 30 and 35, the voltage of the individual batteries of the bank 20 and the entire battery bank 20 are monitored by the micro-controller.

From the data supplied to it, the micro-controller 25 can determine whether the batteries are being charged or discharged, and the amount of such charge or discharge and also the battery voltage output either during operation of electric motor 35 or under a no load condition. The micro-controller 25 stores algorithms and programs to calculate from the acquired data various factors such as battery internal resistance (impedance) and SOC. It can also track the acquired data against programmed algorithms to determine when certain conditions of the battery have been reached. This is explained below relative to FIGS. 2 and 3.

Responding to the command from the micro-controller 20, the CV controller 15 outputs a regulated electric energy (amount of current) to charge the batteries in battery bank 20, or other storage devices such as super capacitors, to store the energy.

There can be switches (not shown) to prevent the battery discharging into the CV controller 15 when the regenerative component 10 has no energy to supply to the battery between the battery bank 20 and the CV controller 15 operated and controlled by the micro-controller 25. Alternately, the CV controller 15 may include remote controllable actuators to function as switches.

Charging of the batteries 20 is controlled in a manner to achieve a relatively high level of SOC, for example, about 80% and to recharge the batteries at a relatively high efficiency level. This is explained below.

Figure 2:
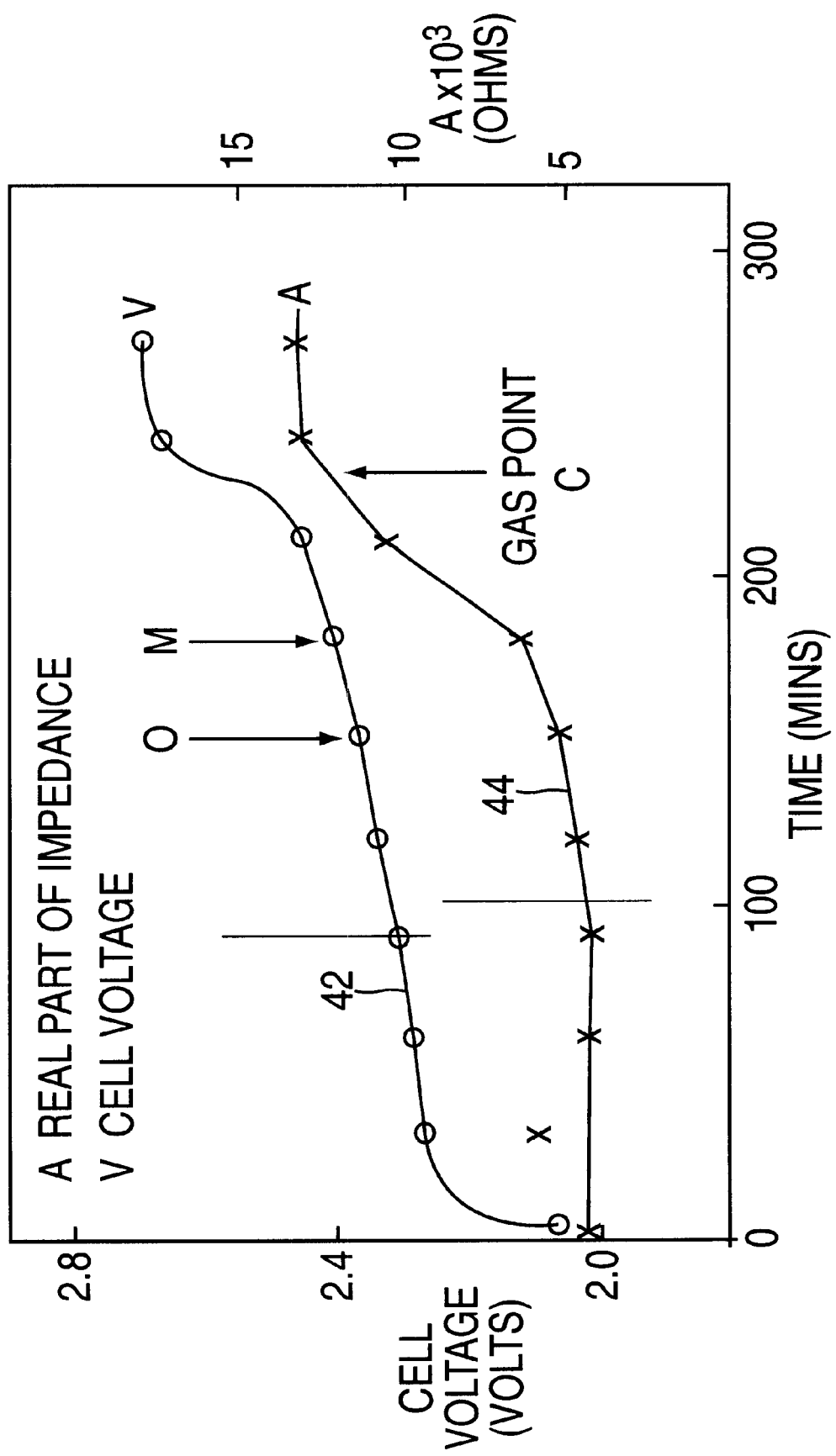
FIG. 2 is a graph showing battery cell voltage and impedance related to its gas point and charge time.

FIG. 2 describes the behavior of a lead acid cell voltage and its impedance as a function of charge time when the cell is charged at a constant current. Similar curves exist for other types of storage batteries, such as nickel- cadmium and nickel metal hydride batteries. This relationship is described in greater detail in U.S. Pat. No. 4,745,349, which is assigned to the assignee of the subject application and is hereby incorporated in its entirety by reference.

FIG. 2 shows a single cell of a lead-acid battery having a voltage range of from 2.0 to 2.65 volts. If cells are connected in series, this would be a per cell value. The data for the curves of FIG. 2 corresponding to the size and type of battery 20 in the vehicle, are programmed into the micro-controller 25 so that it is available to be compared to the data acquired from the batteries of bank 20 as they are charged and discharged.

As seen in FIG. 2, as a constant current charge is applied to the battery cell over time, shown in minutes, the battery cell voltage V, shown by the solid line 42, exhibits a sharp rise at the battery charge gas point C, in the cell voltage response, shown by the dotted line 44. The increase in voltage occurs at the gas point C due to starting of a gas evolution reaction.

It should be understood that as the battery is being charged over time, that its SOC will increase, assuming that the battery is not defective. Thus, the value of voltage V and impedance A during battery charging is related to battery SOC. At any time after the gas point C, or when the battery voltage is higher than the voltage value of the rise at gas point C, the charge current is more than the cell can accept in the charge reaction. The excess current substantially only produces gas in the battery.

From FIG. 2 it can be seen on line 44 that the cell impedance A is high during the time starting from point C, when the gas evolution is initiated. In fact, the cell impedance A also exhibits a sharp rise somewhat prior to the rise in the cell voltage V. As shown, the impedance A starts to rise slowly when the battery voltage V is at the point O on line 42 and rapidly at the voltage point M. Early occurrence of the increase in cell impedance compared to the increase in cell voltage is due to adsorption of the gas on the surfaces of the cell plates.

As can be seen from FIG. 2, the battery gas point can be determined by measuring either or both of the battery impedance or its voltage during the charging. Both of these parameters can be measured and continually monitored by the micro-controller 25.

The increase in cell impedance leads to an increase in cell temperature due to additional cell internal resistance (IR) heating. For this reason the charge current and charge voltage should be controlled so that no gas evolution reaction occurs during charging. From FIG. 2 it can be seen that the point M should be the upper voltage limit, so as to prevent gas evolution. This corresponds to 2.4 V/cell in a lead-acid battery. It is preferable to have the voltage limit at the point O which corresponds to 2.35 V/cell. That is, the charging voltage should not exceed 2.35 V/cell, meaning that the charge current from the regenerative system should be reduced or terminated corresponding to the point after about 150 minutes in FIG. 2. By monitoring the battery voltage and keeping it below the value at which gas evolution occurs, the battery can be charged to higher SOC levels.

In industrial lead-acid batteries (thick plate construction), the point M occurs at around 80% state of charge. In automotive batteries (thin plate construction), the point M is closer to 90% state of charge. These values are higher than the 65% state of charge used in normal operation of the electric and hybrid vehicle batteries. By maximizing the charge current and quickening the charge time, the 80% or 90% SOC value can be reached.

In accordance with the invention, it is preferred that when the battery is recharged by the component 10, that the magnitude of the charge current applied be as high as possible when charging starts, without exceeding the safe limit of the vehicle wires and other components. To explain this, reference is made to FIG. 3.

Figure 3:
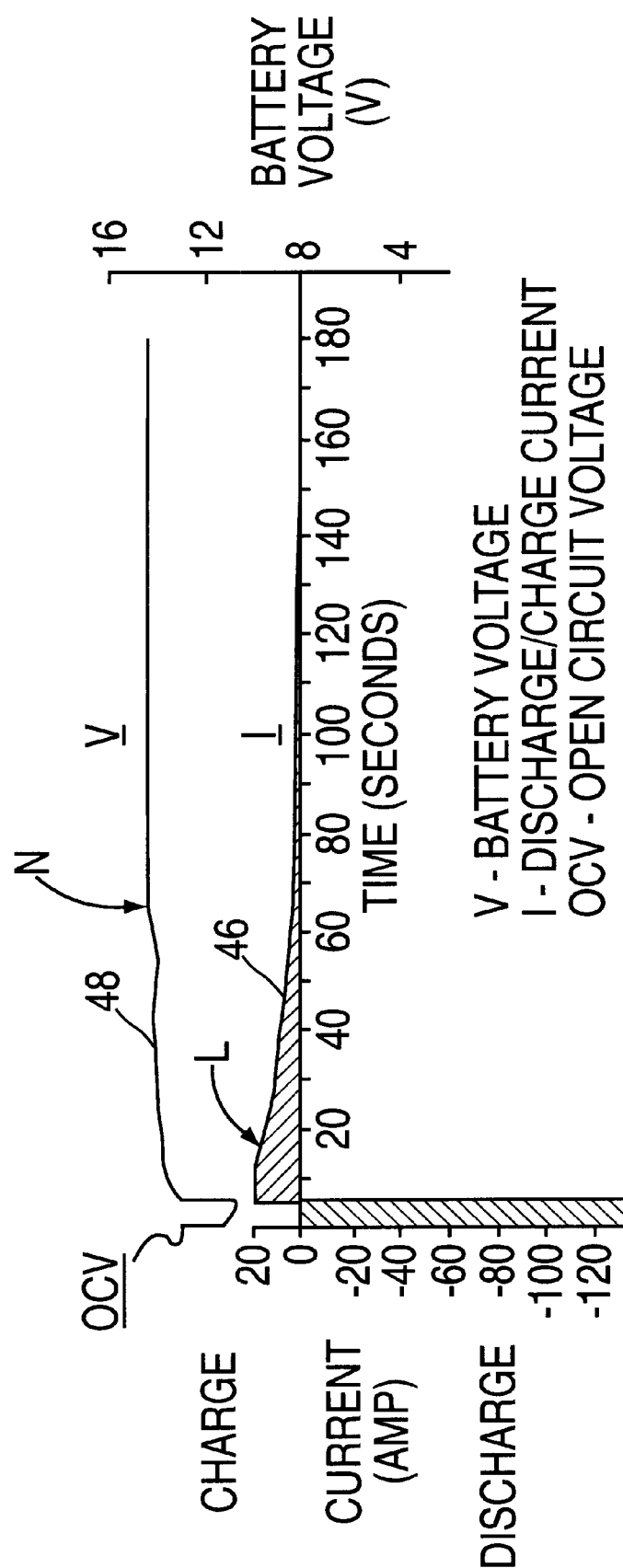
FIG. 3 is a graph showing battery voltage and current during a discharge and immediate recharge.

FIG. 3 shows the current I, line 46, and voltage V, line 48, behavior of a fully charged 12 volt automotive lead-acid battery during a simulated vehicle starting process. This is described in greater detail in U.S. Pat. No. 4,937,528 which also is assigned to the assignee of the invention and is hereby incorporated by reference. As seen, just prior to starting the battery has an OCV (open circuit voltage) of about 12.7 volts and battery current of 0 amps. At the time of starting there is a large current discharge from the battery, as shown on the graph vertical axis. This is caused by the current drawn to start the vehicle motor and other systems. The current discharge pulse is of about 5 seconds duration and is followed by the recharge from a charging system, such as an alternator/regulator in the car. The recharge is shown for a period over about 175 seconds with a voltage limitation, as set by the alternator construction and various devices, such as Zener diodes, on line V of 14.1 V. This is equal to 2.35 V/cell and corresponds to the optimal point O in FIG. 2.

Two important points should be noted in FIG. 3. For the current 1, line 46, supplied to the battery, up until time point L the current intake by the battery is limited only by the current output limitation of the charging system. That is, the size of the alternator and its components and the vehicle wiring.

The voltage limitation of 14.1 V is reached at the point N on curve 48, which occurs at about the 65 seconds time mark in FIG. 3. At this time, the current charge intake corresponding to voltage point N is more than about 80% of the amount of the discharge pulse. Thus, from this pulse test it is clear that the battery is capable of being quickly recharged with more than 80% of the charge taken out during the immediately preceding discharge. This is true even when the battery's SOC was near 100% to start with, as shown in this case.

In general, the higher the charge current immediately after the discharge pulse, the better the charge efficiency within the voltage constraints of 2.35 V/cell. That is, the greater the magnitude of current that is supplied, the less time it will take for the battery to reach the desired 2.35 V/cell limit. Similarly, the faster the recharge, without placing the battery in an open circuit condition, the higher the charge efficiency. Referring to FIG. 2, above the voltage of 2.35 V/cell, the charge efficiency decreases due to the energy being used to generate gas in the battery and battery IR heating. As a result, the battery gets hot which is not good for its life.

In the present state of the art, electric and hybrid vehicle batteries are operated at around 60%–65% state of charge (SOC) under the belief that the impedance and charge efficiency are better around this value SOC. However, as explained above, I have found that this is true only if the battery is allowed to reach equilibrium. When the battery is in a dynamic situation, such as discharge caused by the electric motor load and recharge caused by dumping the regenerative energy immediately after removing the load, a significant percentage of the energy can be put back into the battery without evolving gas. The only important criteria are (1) dump as much current as possible and as quickly as possible and (2) to limit the voltage to 2.35 to 2.4 V/cell. Use of this voltage limitation makes it possible to reach around 80%–90% SOC. This limit voltage may be adjusted depending on the ambient temperature. In general, the lower the battery temperature, the higher the voltage limit.

Figure 4:
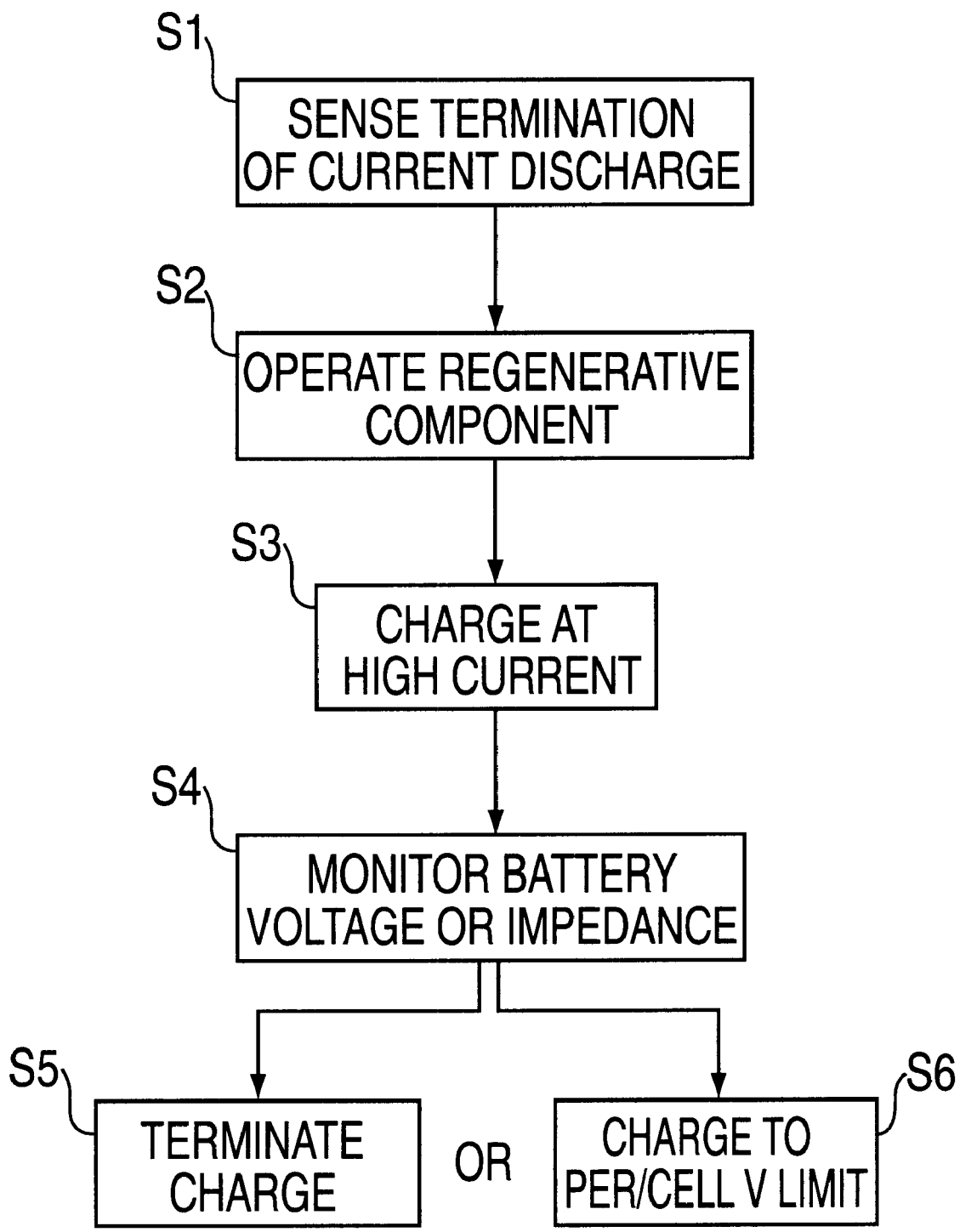
FIG. 4 is a flow chart of the operation of the invention.

Accordingly, the system of FIG. 1 operates in the following general manner. Referring to FIG. 4, the micro-controller 25 is programmed (S1) to sense the termination of a battery discharge, either substantially continuous or of the pulse type, such as when use of the electric motor 35 is stopped, and vehicle braking occurs.

After such a termination of discharge, whether continuous or pulse type, the regenerative component 10 is driven (S2) by the vehicle mechanical system to produce current that is supplied to the CV controller 15. The micro-controller 25 controls the current output of the CV controller to battery bank 20 so as to satisfy two requirements. First, (S3) the maximum amount of current is to be less than the safe value limit of the vehicle wiring and other components. Second, (S4) the data of the battery voltage or the battery impedance is monitored during charging. This data is used to control the current charge (S5) to occur only up until the time at or slightly before that at which the gas point occurs (see FIG. 2). When the gas point limit is reached, the battery charging is terminated by the micro-controller 25, by either stopping the regenerative component 10 from producing an output (S5), such as mechanically disengaging it from the braking system, or operating the CV controller 15 so as not to produce an output to the battery bank 20. Also, (S6) the rate of charging can be limited so that the 2.35V/cell value of FIG. 3 is not exceeded. Other voltage values would be used for different types of batteries.

The rate and the amount of regenerative energy dumped into the battery may also be controlled depending on the time elapsed between the discharge and the charge process at higher state of charge conditions. This control is primarily achieved by using voltage as an indicator. The dumping current is maintained such that the battery voltage does not increase more than a predetermined value, this being 2.35V/cell in a lead acid battery.

It is also preferred that the battery be periodically charged to its full charge either while on the vehicle or in the battery shop. This will desulfate the battery to the extent, large or small, that the sulfation has built up in the battery during the persistent undercharged operational condition of the battery.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A method for optimizing charging of a storage battery in an electric or hybrid vehicle having a motor that uses current from the battery and a regenerative current supply system, said method comprising the steps of:

providing a recharging current to the battery from the regenerative system when the motor stops drawing current from the battery;

monitoring at least one of the battery voltage and internal impedance to determine a gas evolution point when gas evolution occurs; and continuing the charging of the battery up to a point before the gas evolution point.

2. The method of claim 1 wherein the step of providing the charging current includes supplying a maximum value of current consistent with system components and wiring and is carried out as soon as possible after the time that battery discharge stops.

3. The method according to claim 1 further comprising monitoring the battery voltage during charging and continuing charging with the battery voltage at a value below that at which gas evolution occurs.

4. The method according to claim 1 wherein the battery is of the lead-acid type and further comprising the step of monitoring the battery voltage during charging and limiting the battery voltage to substantively between about 2.34 to 2.4 V/cell.

5. The method of claim 1 further comprising the steps of applying the charging current at a maximum value of current consistent with the system components and wiring and continuing charging with the battery voltage at a value below that at which gas evolution occurs.

6. A system for optimizing charging of a battery in an electric or hybrid vehicle, said system comprising:

a regenerative element for producing current to recharge the battery from energy provided by a mechanical component of the vehicle;

an electric motor connected to said battery and discharging current therefrom for operating the vehicle; and control means for sensing termination of a battery discharge and responsive to termination of battery discharge to activate said regenerative element and to supply current therefrom to recharge the battery, said control means including means for monitoring at least one of the battery voltage and impedance during recharging and responsive thereto for limiting the current recharge to a point before battery gas evolution occurs.

7. A system as in claim 6 wherein said control means comprises:

a load controller connected between said regenerative element and said battery and operated to control the current supplied to said battery.

8. A system as in claim 7 wherein said control means further comprises:

a micro-controller connected to receive data of the battery voltage, discharge current and charge current.

9. A system as in claim 8 wherein said micro-controller is programmed with an algorithm that indicates the battery gas point and operates in response to the data acquired from said battery to control said load controller to maintain the battery voltage below a predetermined level during battery charging.

* * * * *